United States Patent [19]

McCauley

[11] Patent Number: 5,329,878
[45] Date of Patent: Jul. 19, 1994

[54] LITTER CONTAINER HAVING INTERNAL AND EXTERNAL ACCESS RAMPS

[76] Inventor: Rhonda R. McCauley, 4905 Osage Dr., #201, Boulder, Colo. 80303

[21] Appl. No.: 995,419
[22] Filed: Dec. 18, 1992
[51] Int. Cl.⁵ .............................................. A01K 1/02
[52] U.S. Cl. .................................... 119/165; 117/158
[58] Field of Search ............... 119/161, 162, 165, 166, 119/167, 168, 169, 170, 158; 4/504, 513, 555, 571, 572, 621, 622

[56] References Cited

U.S. PATENT DOCUMENTS

| | | | |
|---|---|---|---|
| D. 250,051 | 10/1978 | Spinks .................................... | D30/99 |
| 2,579,797 | 12/1951 | Churchfield et al. ............... | 119/28.5 |
| 3,208,434 | 9/1965 | Barton .................................. | 119/158 |
| 3,482,546 | 12/1969 | Anderson . | |
| 3,618,568 | 11/1971 | Breeden ............................. | 119/165 |
| 3,752,120 | 8/1973 | Pallesi . | |
| 3,793,653 | 2/1974 | Brooks ................................. | 4/513 |
| 3,793,989 | 2/1974 | Clark . | |
| 4,029,048 | 6/1977 | Gershbein . | |
| 4,332,217 | 6/1982 | Davis .................................. | 119/158 |
| 4,667,622 | 5/1987 | Breault . | |
| 4,760,816 | 8/1988 | Rhodes ............................... | 119/165 |
| 4,788,935 | 12/1988 | Bella et al. . | |
| 4,807,808 | 2/1989 | Reed .................................... | 229/103 |
| 4,838,202 | 6/1989 | Neu . | |
| 4,919,078 | 4/1990 | Morrison ............................. | 119/108 |
| 5,027,748 | 7/1991 | Wolak ................................. | 119/168 |

FOREIGN PATENT DOCUMENTS

| | | | |
|---|---|---|---|
| 972236 | 8/1975 | Canada ................................. | 119/161 |
| 0003093 | 7/1979 | European Pat. Off. ............. | 119/170 |
| 2456471 | 1/1981 | France ................................. | 119/170 |

Primary Examiner—Gene Mancene
Assistant Examiner—Todd E. Manahan
Attorney, Agent, or Firm—John R. Flanagan

[57] ABSTRACT

A litter container assembly particularly suited for accommodating a pot belly pig includes a litter container defining an enclosed area for containing a quantity of animal litter and having a sidewall with an opening formed therein, and an inclined ramp structure attached to the sidewall adjacent to the opening therein and extending therefrom so as to define an entry and exit which leads into and from the enclosed area of the litter container. The ramp structure includes a first ramp inside the container and a second ramp outside the container.

14 Claims, 1 Drawing Sheet

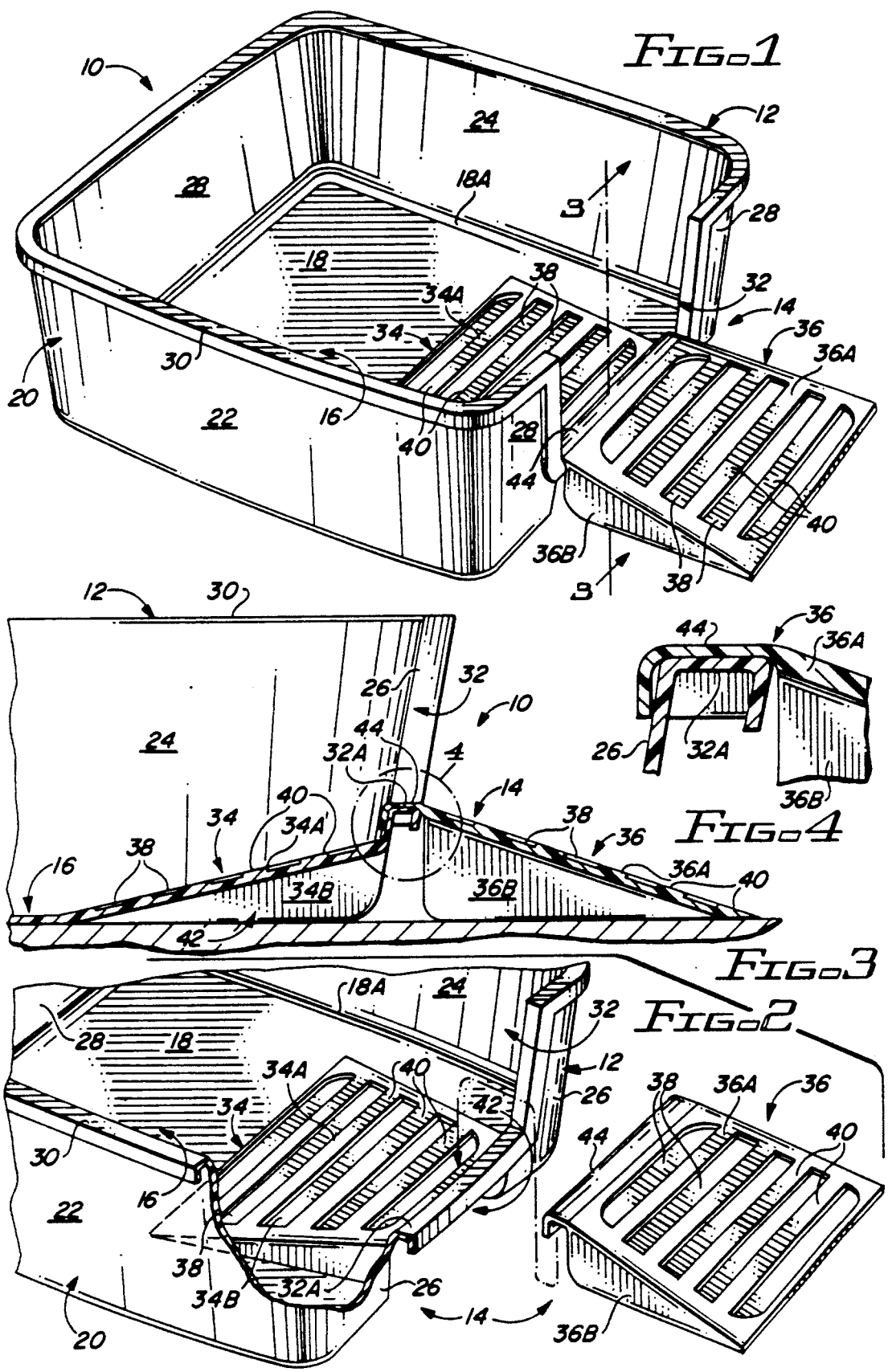

LITTER CONTAINER HAVING INTERNAL AND EXTERNAL ACCESS RAMPS

BACKGROUND OF THE INVENTION

1. Field of the Invention

The present invention generally relates to animal litter containers and, more particularly, is concerned with a litter container assembly, particularly suited for pot pelly pigs.

2. Description of the Prior Art

The use of litter containers for certain household pets, such as cats, is a widespread practice. Litter containers make it possible to keep such pets indoors by providing a means by which the pets may eliminate their waste through urination and defecation without the need to go outdoors. Thus, use of litter containers makes it more convenient to keep household pets.

Present litter containers are almost universally designed for household cats. Such litter containers can have relatively high sidewalls since all cats are capable of climbing or jumping in and from the litter containers. An animal which is growing in popularity as a household pet is commonly known as a pot belly pig. Such pigs range from 14 to 17 inches in height and 30 to 90 pounds in weight and have overly short legs.

The conventional litter containers are too small in length and width to comfortably accommodate use by the larger size pot belly pigs. Also, the conventional litter containers are too great in height to permit easy entry and exit by the short-legged pot belly pigs.

Thus, a need exists for improvement of the design of litter containers in order to accommodate use by pot belly pigs.

SUMMARY OF THE INVENTION

The present invention provides a pot belly pig litter container assembly designed to satisfy the aforementioned need. The litter container assembly of the present invention employs features which accommodate the relatively tall bodies and short legs of pot belly pigs and thereby provides an accessory which responds to the growing popularity of such animals as household pets.

Accordingly, the present invention is directed to a litter container assembly for a pot belly pig which comprises: (a) a litter container defining an enclosed area for containing a quantity of animal litter, the container having a sidewall with an opening formed therein; and (b) means for defining an inclined ramp which leads into and from the enclosed area of the litter container. The ramp defining means is attached to the sidewall adjacent to the opening therein and extending therefrom.

More particularly, the litter container includes a bottom wall and a sidewall having a pair of opposite side portions and a pair of opposite end portions extending between and interconnecting the side portions. The side portions and end portions are connected about and extend upwardly from a peripheral edge of the bottom wall and form a top peripheral edge defining an open top of the container. One of the end portions has an opening formed therein with a lower edge spaced above the bottom wall of the container.

Further, the means for defining the inclined ramp is located both inside and outside of the container. The inclined ramp defining means includes an pair of first and second ramp structures. Each of the ramp structures has an inclined top wall and a pair of wedge-shaped side walls connected to and extending downwardly from opposite lateral edges of the top wall. The first ramp structure is disposed inside of the container, whereas the second ramp structure is disposed outside of the container with the inclined top wall thereof being oriented in the reverse of the inclined top wall of the first ramp structure. The first ramp structure is fixedly attached to the container, whereas the second ramp structure is removably attachable to the container.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a top perspective view of a pot belly pig litter container assembly of the present invention showing the removable one of a pair of ramp structures assembled to the litter container.

FIG. 2 is an exploded fragmentary perspective view of the litter container assembly of FIG. 1, with portions broken away.

FIG. 3 is an enlarged fragmentary sectional view of a front end of the litter container assembly taken along line 3—3 of FIG. 1.

FIG. 4 is an enlarged view of the sectioned portion of the assembly enclosed by circle 4 of FIG. 3.

DETAILED DESCRIPTION OF THE INVENTION

Referring to the drawings, and particularly to FIGS. 1 and 2, there is illustrated a litter container assembly, generally designated 10, constructed in accordance with the principles of the present invention. The litter container assembly 10 can be used by any animal which ordinarily uses any conventional litter containers. However, the litter container assembly 10 is particularly well-suited for accommodating pot belly pigs.

The litter container assembly 10 basically includes a litter container 12 and an entry and exit ramp 14 which leads into and from the litter container 12. The litter container 12 defines an enclosed area 16 for receiving and containing a quantity of animal litter (not shown).

The litter container 12 of the assembly 10 has a generally rectangular box-like shape and is constructed of a bottom wall 18 and a continuous sidewall 20 having a pair of opposite side portions 22, 24 and a pair of opposite front and rear end portions 26, 28 extending between and interconnecting the side portions 22, 24. The side portions 22, 24 and end portions 26, 28 of the sidewall 20 are connected about and extend upwardly from a peripheral edge 18A of the bottom wall 18 and form a top peripheral edge 30 defining an open top of the container 12. Preferably, the side portions 22, 24 and end portions 26, 28 of the sidewall 20 are of the same height and flare slightly outwardly from the vertical with respect to one another.

The front end portion 26 has an entry and exit opening 32 for the container 12 formed therein with a lower edge 32A spaced above the bottom wall 18 of the container 12. Preferably, the opening 32 is defined by a cutout made in the front end portion 26 to a depth from the top peripheral edge of the container sidewall 30 which is greater than one-half the height of the front end portion 26.

Referring to FIGS. 1 to 4, the entry and exit ramp 14 of the assembly 10 is attached to the front end portion 26 of the sidewall 20 adjacent to the opening 32 therein and extend outwardly therefrom. The ramp 14 includes an pair of first and second ramp structures 34, 36. Each ramp structure 34, 36 has an inclined trapezoidal-shaped top wall 34A, 36A and a pair of wedge-shaped side walls 34B, 36B connected to and extending downwardly from opposite lateral edges of the top wall 34A, 36A. Also, channels 38 are recessed in the top wall 34A, 36A so as to defined non-slip treads 40 on the top wall.

The first ramp structure 34 is disposed inside of the container 12, whereas the second ramp structure 36 is disposed outside of the container 12 with the inclined top wall 36A thereof being oriented in the reverse of the inclined top wall 34A of the first ramp structure 34. The grade or slope of the first ramp structure 34 is less than that of the second ramp structure 36. Also, preferably although not necessarily, the first ramp structure 34 is fixedly attached to the bottom wall 18 and front end portion 26 of the sidewall 20 of the container 12, whereas the second ramp structure 36 is removably attachable to the front end portion 26 of the container 12. The portion of the bottom wall 18 underlying the first ramp structure 34 has a cutout 42 such that the lower edges of the top wall 34A and side walls 34B of the first ramp structure 34 are rigidly attached to the inside periphery of the bottom wall 18 defining the cutout 42. The second ramp structure 36 has a hook-shaped end portion 44 removably disposable over the lower edge 32A of the opening 32 in the front end portion 26 of the sidewall 20.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. A litter container assembly for a pot belly pig, comprising:
   (a) a litter container defining an enclosed area for containing a quantity of animal litter, the container having a bottom wall and a sidewall with an opening formed therein, said opening being spaced above said bottom wall; and
   (b) means defining an inclined ramp which leads into and from said enclosed area of said litter container for supporting an animal during entry into and exit from said litter container, said ramp defining means being attached to the sidewall adjacent to said opening therein and extending therefrom, said means defining said inclined ramp having a first ramp structure being located inside of said litter container and a second ramp structure being located outside of said litter container, said first ramp structure being supported upon and in contact with said bottom wall of said litter container and extending between the bottom wall and said opening formed in said sidewall spaced above said bottom wall.

2. The assembly of claim 1 wherein said sidewall of said litter container extends continuously about a periphery of said bottom wall, said opening having a lower edge being spaced above said bottom wall of said container.

3. The assembly of claim 1 wherein said container is open at a top peripheral edge formed by said sidewall.

4. The assembly of claim 1 wherein said sidewall includes:
   a pair of opposite side portions; and
   a pair of opposite end portions extending between and interconnecting said side portions.

5. The assembly of claim 4 wherein said side portions and end portions of said sidewall are connected about and extend upwardly from a peripheral edge of said bottom wall.

6. The assembly of claim 4 wherein said container is open at a top peripheral edge formed by said side portions and end portions.

7. The assembly of claim 4 wherein one of said end portions has a cutout defining said opening, said opening having a lower edge being spaced between top and bottom edges of said end portion.

8. The assembly of claim 7 wherein said cutout has a depth from said top edge of said end portion being greater than one-half the height of said end portion.

9. The assembly of claim 1 wherein said first and second ramp structures are respective first and second wedge-shaped structures, each of said wedge-shaped structures having an inclined top wall and a pair of wedge-shaped side walls connected to and extending downwardly from opposite lateral edges of said top wall, said first wedge-shaped structure being disposed inside of said container, said second wedge-shaped structure being disposed outside of said container with said inclined top wall thereof being oriented in the reverse of said inclined top wall of said first structure.

10. The assembly of claim 9 wherein said second structure has a hook-shaped portion disposable over a lower edge of said opening in said sidewall.

11. The assembly of claim 1 wherein said first ramp structure is fixedly attached to said bottom wall of said container, whereas said second ramp structure is removably attachable to said sidewall of said container adjacent to said opening therein.

12. A litter container assembly for a pot belly pig, comprising:
   (a) a litter container defining an enclosed area for containing a quantity of animal litter, the container including a bottom wall and a sidewall having a pair of opposite side portions and a pair of opposite end portions extending between and interconnecting said side portions, said side portions and said end portions being connected about and extending upwardly from a peripheral edge of said bottom wall and forming a top peripheral edge defining an open top of said container, one of said end portions having an opening formed therein with a lower edge spaced above said bottom wall of said container; and
   (b) means defining an inclined ramp which leads into and from said enclosed area of said litter container for supporting an animal during entry into and exit from said litter container, said ramp defining means being attached to the sidewall adjacent to said opening therein and extending therefrom, said means defining said inclined ramp having a first ramp structure being located inside of said litter container and a second ramp structure being located outside of said litter container, said first ramp structure being supported upon and in contact with said bottom wall of said litter container and extending between the bottom wall and said opening formed in said sidewall spaced above said bottom wall.

13. The assembly of claim 12 wherein each of said first and second ramp structures has an inclined top wall and a pair of wedge-shaped side walls connected to and extending downwardly from opposite lateral edges of said top wall, said inclined top wall of said second structure being oriented in the reverse of said inclined top wall of said first structure.

14. The assembly of claim 12 wherein said first ramp structure is fixedly attached to said bottom wall of said container, whereas said second ramp structure is removably attachable to said one end portion of said sidewall of said container adjacent to said opening therein.

* * * * *